Jan. 9, 1923.
H. M. DARMSTADTER.
HAND MEASURING DEVICE.
ORIGINAL FILED MAR. 18, 1921.
1,441,268.
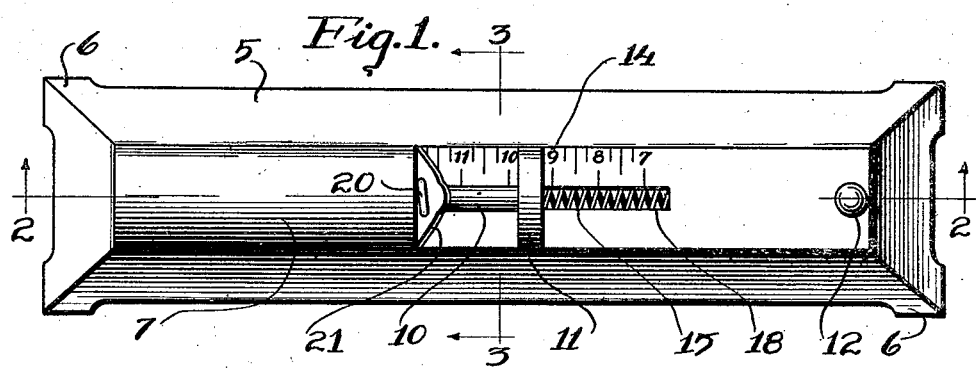
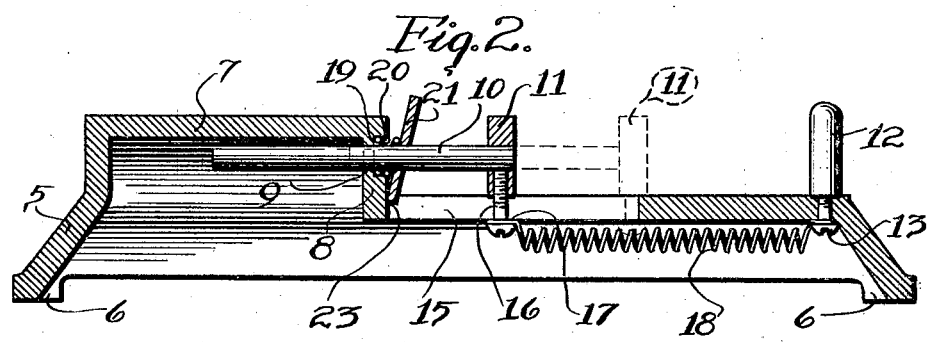
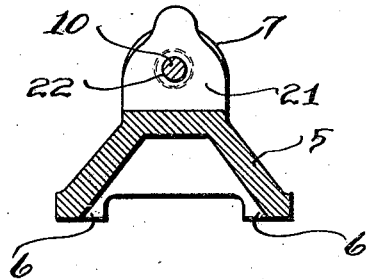
Witness
Geo L Lawrence
Inventor
Herbert M. Darmstadter
By Chas C Tillman
Attorney.

Patented Jan. 9, 1923.

1,441,268

UNITED STATES PATENT OFFICE.

HERBERT M. DARMSTADTER, OF CHICAGO, ILLINOIS.

HAND-MEASURING DEVICE.

Application filed March 18, 1921, Serial No. 453,343. Renewed November 24, 1922.

*To all whom it may concern:*

Be it known that I, HERBERT M. DARMSTADTER, a citizen of the United States, residing at Chicago, in the county of Cook and State of Illinois, have invented certain new and useful Improvements in a Hand-Measuring Device, of which the following is a specification.

This invention relates to improvements in measuring devices, and has particular relation to such devices which are intended to measure the width of hands of persons purchasing gloves, and by a salesman in indicating the size of a glove to fit the hand or hands, and it consists in certain peculiarities of the construction, novel arrangement, and combination of the various parts thereof as will be hereinafter more fully set forth and specifically claimed.

The principal object of the invention is to provide a hand measuring device of the above named general character, which shall be simple and inexpensive in construction, attractive in appearance, convenient for use and more accurate and efficient in operation, than the old style tape measure, usually employed at glove counters, for the same purpose, which tape measures have been found objectionable on account of stretching to such an extent as to be unreliable in indicating accurately the size or width of the hand, as well as, by reason of the fact that the measurer, will, at times, draw the tape tighter on the hand than at others.

A further object of the invention is to so construct the device that it may be supported on a counter or showcase, in such a way that the indicating scale of the device may be disposed in front of, and to the view of the salesman or measurer, to the end that he can accurately read said scale and the position of the indicator or pointer therefor.

Still another object, is, to provide means for automatically locking the indicator of the device in position with reference to the scale as soon as the measure of the hand has been attained, thus allowing the hand to be removed from the device and the indication on the scale closely scrutinized in order to obtain accurate measurement and fit.

Other objects and advantages of the invention will be disclosed in the following description and explanation.

In the accompanying drawing, which serves to illustrate an embodiment of the invention—

Fig. 1 is a plan view of a measuring device embodying the invention.

Fig. 2 is a vertical central sectional view taken on line 2—2 of Fig. 1 looking in the direction indicated by the arrows, and Fig. 3 is a cross-sectional view taken on line 3—3 of Fig. 1.

Like numerals of reference refer to corresponding parts throughout the different views of the drawing.

The reference numeral 5 designates the elongated hollow base of the device, which is by preference substantially rectangular in shape when viewed in plan, and is provided at each of its corners with a depending leg 6 to rest on a counter or show case, which legs may be cushioned at their lower ends to prevent marring or scratching the surfaces upon which they rest.

The base 5 may be made of any suitable material, but by preference of metal, and as shown in the drawing, has on its upper portion a hollow and upwardly rounded enlargement 7 which extends from near one end of the base 5 longitudinally therewith to a point near the middle of said base, at which point said enlargement terminates with a transversely disposed and vertical wall 8 which is provided in its upper portion with an opening 9 for the reception of a guide rod 10 for the movable hand rest and indicator 11 which is fixed to the outer end of the guide rod 10 so as to move therewith. At the opposite end of the base or frame 5 from that on which the enlargement 7 is mounted, is a vertically disposed hand rest or projection 12 which may be in the form of a rod, as shown, or of any other desired shape, and is by preference secured in its vertical position by means of a screw 13 extended through a suitable opening in the top of the base 5 and engaging a suitable opening in the projection 12.

Between the projection 12 and the adjacent end of the enlargement 7 the upper surface of the base is provided with a graduated scale indicated as a whole by the numeral 14, which scale is preferably located on the edge of the top of the base or frame adjacent to the salesman or measurer when the same is being used.

As shown in Figs. 1 and 2 of the drawing, the top of the base or frame is provided with a longitudinally disposed slot 15 which extends from the inner end of the enlargement 7 towards the post or projection 12 and is for the reception and operation of a downward extension 16 such as a screw, which engages at its upper end the lower portion of the hand rest and indicator 11. This downward extension or screw 16 has interposed between its head and the lower surface of the top of the base or frame a washer 17 for the purpose of permitting movement of said extension or screw within said slot without undue friction. The extension 16 is connected at its lower end to the screw or extension 13 by means of a coiled spring 18 which exerts its tension against the extension or screw 16 so as to retract the hand measure and indicator 11 and to normally hold the same in about the position shown in dotted lines in Fig. 2 of the drawing. In the last named figure of the drawing, it will be observed that the wall 8 of the enlargement 7 is provided on its outer surface around the guide rod 10 with a recess 19 in which is located one end of a spring 20 which is coiled around the rod 10 and contacts at its other end with a locking plate 21 which is provided with a slightly enlarged opening 22 for the reception of the rod 10 and is seated at its lower end in a transversely disposed recess 23 in the upper surface of the top of the base or frame 5 at the outer surface of the wall 8 of the enlargement 7 on said base.

By this arrangement the locking plate 21 will be normally held in about the position shown by continuous lines in Fig. 2, thus locking the guide rod 10 and the hand rest and indicator 11 in any position to which they may be advanced by the insertion of the hand being measured, between the fixed projection 12 and movable projection or hand rest and indicator 11 against the tension of the spring 18. However, this locking plate 21 will offer but little frictional resistance to the guide rod 10 as it is advanced therethrough as the spring 20 will yield sufficiently to permit of such movement of the locking plate towards the enlargement 7 as to allow the guide rod to pass through the opening in the locking plate without undue hindrance.

From the foregoing and by reference to the drawing, it will be readily understood and clearly seen that when it is desired to measure the hand all that is necessary to be done, is, to place the hand against the surface of the member 11 adjacent the projection 12 and to push said member against the tension of the spring 18 until the other side of the hand will rest against the inner surface of the projection 11, and on top of the base. When thus located, the hand rest 11 will indicate on the scale 14, the number or size of the glove required. Now, when the hand is in position as above described, with respect to the device, shadows might be cast by the arm or hand and it might be difficult for the measurer to read the scale, and for this purpose the locking plate 21 is employed to hold the guide rod and hand rest and indicator 11 firmly in position so that the hand may be withdrawn from the device, when the measurer can accurately read the indication on the scale 14 by the rest or indicator 11.

Having thus fully described my invention, what I claim as new and desire to secure by Letters Patent is:

1. In a device of the class described, the combination with an enlongated hollow base having an upwardly and longitudinally extended enlargement on its upper surface near one end thereof, said enlargement provided with a cavity extended above the plane of the top of the base and having in one of its ends an opening, said base having in its top a longitudinally disposed slot extended from the inner end of said enlargement, of a fixed hand-rest vertically mounted on the base, a guide rod movably located in the opening of said enlargement, a hand-rest and indicator on said rod to move therewith and having an extension located in said slot, a spring secured at one of its ends to the extension of the movable hand-rest and at its other end to a fixed support and adapted to exert its tension to draw the movable hand-rest towards the fixed one, and a scale located on the base adjacent the path of movement of the movable hand-rest and indicator, said scale having thereon graduations indicating the size of a hand interposed between the hand-rests.

2. In a device of the class described, the combination with a hollow base having an upwardly and longitudinally extended enlargement on its upper surface near one end thereof, said enlargement having in its inner end an opening, said base having in its top a longitudinally disposed slot extended from the inner end of said enlargement, of a fixed hand-rest vertically mounted on the base, a guide rod movably located in the opening of said enlargement, a hand-rest and indicator fixed on said rod and having an extension located in said slot, a spring secured at one of its ends to the extension of the movable hand-rest and at its other end to a fixed support and adapted to exert its tension to draw the movable hand-rest towards the fixed one, a scale located on the base adjacent the path of movement of the movable hand-rest and indicator, said scale having thereon graduations indicating the size of a hand interposed between the hand-rests, and a spring actuated locking plate mounted on the base for tilting movement and co-operating with the guide rod to lock the latter and the hand-rest and indicator carried thereby in their advanced positions.

HERBERT M. DARMSTADTER.